United States Patent
Vrba et al.

(10) Patent No.: US 11,312,390 B2
(45) Date of Patent: Apr. 26, 2022

(54) VEHICLE CONTROL SYSTEM

(71) Applicant: Westinghouse Air Brake Technologies Corporation, Wilmerding, PA (US)

(72) Inventors: Matthew Vrba, Marion, IA (US); Ann Grimm, Cedar Rapids, IA (US); Scott Sollars, Marion, IA (US); Phil Burgart, Cedar Rapids, IA (US); Jim Oswald, Coggon, IA (US)

(73) Assignee: westinghouse air brake technologies corporation, Wilmerding, PA (US)

( * ) Notice: Subject to any disclaimer, the term of this patent is extended or adjusted under 35 U.S.C. 154(b) by 228 days.

(21) Appl. No.: 16/535,966

(22) Filed: Aug. 8, 2019

(65) Prior Publication Data

US 2021/0039668 A1    Feb. 11, 2021

(51) Int. Cl.
*B60W 50/14* (2020.01)
*G05D 1/02* (2020.01)
*B60W 50/00* (2006.01)

(52) U.S. Cl.
CPC ........... *B60W 50/14* (2013.01); *G05D 1/0274* (2013.01); *B60W 2050/0067* (2013.01); *B60W 2540/215* (2020.02)

(58) Field of Classification Search
CPC ........... B60W 50/14; B60W 2540/215; B60W 2050/0067; G05D 1/0274
See application file for complete search history.

(56) References Cited

U.S. PATENT DOCUMENTS

| | | | | |
|---|---|---|---|---|
| 5,185,628 A * | 2/1993 | Wilson | ............... | G03G 15/5016 399/81 |
| 5,978,718 A * | 11/1999 | Kull | ....................... | B61L 29/00 701/19 |
| 6,345,257 B1 * | 2/2002 | Jarrett | ................. | B61L 27/0083 705/305 |
| 8,509,971 B1 * | 8/2013 | Isailovski | ............. | B60T 13/665 701/20 |
| 9,841,287 B1 * | 12/2017 | Hayward | ......... | G08G 1/096783 |
| 10,102,597 B1 * | 10/2018 | Castonguay | ........... | G06Q 50/16 |
| 10,421,472 B2 * | 9/2019 | Shubs | .................. | B61L 27/0077 |
| 2004/0167687 A1 * | 8/2004 | Kornick | .................. | B61L 17/00 701/19 |
| 2004/0181337 A1 * | 9/2004 | Kawasaki | .......... | G01C 21/3407 701/411 |
| 2005/0125113 A1 * | 6/2005 | Wheeler | ............... | B61L 25/025 701/19 |
| 2005/0253926 A1 * | 11/2005 | Chung | .................. | B61L 25/025 348/148 |

(Continued)

*Primary Examiner* — Yazan A Soofi
*Assistant Examiner* — Naeem Taslim Alam
(74) *Attorney, Agent, or Firm* — The Small Patent Law Group LLC; Joseph M. Butscher

(57) ABSTRACT

A vehicle control system and method display a map within a designated viewing area of a display device. The map provides information on a location of a vehicle and restrictions on vehicle movement. Prompts for response from a vehicle operator are displayed with the map. The prompts are based on the vehicle location and/or the movement restrictions. The are displayed on the vehicle display device but outside of the designated viewing area of the vehicle display device. Operator input is received in response to the one or more prompts to verify that the vehicle is moving according to the one or more restrictions on the movement of the vehicle.

22 Claims, 8 Drawing Sheets

(56) References Cited

U.S. PATENT DOCUMENTS

| | | | |
|---|---|---|---|
| 2007/0067757 A1* | 3/2007 | Amemiya | H04L 41/12 717/136 |
| 2007/0180392 A1* | 8/2007 | Russo | G06F 3/0482 715/765 |
| 2008/0010605 A1* | 1/2008 | Frank | G06F 16/38 715/765 |
| 2010/0185472 A1* | 7/2010 | Goodermuth | G06Q 10/10 705/7.11 |
| 2014/0054424 A1* | 2/2014 | Xu | B61L 25/026 246/122 R |
| 2014/0088802 A1* | 3/2014 | Knollmann | B61L 15/0072 701/20 |
| 2014/0380178 A1* | 12/2014 | Kapahi | G06F 3/0488 715/738 |
| 2015/0307119 A1* | 10/2015 | Ghaly | B61L 25/06 246/122 R |
| 2017/0106883 A1* | 4/2017 | Shubs, Jr. | B61L 15/0081 |
| 2017/0253258 A1* | 9/2017 | Bramucci | B61L 27/0005 |
| 2018/0093687 A1* | 4/2018 | Bartek | G08B 3/10 |
| 2019/0012059 A1* | 1/2019 | Kwon | G06F 3/0488 |
| 2020/0198599 A1* | 6/2020 | Schulz-Weiling | B60T 7/12 |

\* cited by examiner

VEHICLE CONTROL SYSTEM

BACKGROUND

Technical Field

Embodiments of the subject matter disclosed herein relate to systems and methods that coordinate with vehicle operators for the operation of vehicles.

Discussion of Art

A variety of vehicle systems operate to restrict movements of vehicles. A system can display warnings to operators onboard the vehicles of upcoming vehicles, obstructions, or the like. This system can require the operators to respond to requests for information or requests for confirmation of events to ensure that the vehicles are operated by attentive operators.

One example of such a system is the Positive Train Control (PTC) system. This system can be onboard a rail vehicle to generate a display for an operator of the rail vehicle. This display can present a map showing where the rail vehicle is located relative to targets along a track being traveled by the rail vehicle. The PTC system repeatedly generates prompts on the display that require an operator response for continued movement of the rail vehicle. These prompts can require the operator to indicate whether the rail vehicle has moved past a listed location, to indicate the position or state of a switch at an intersection of tracks, to indicate whether another rail vehicle has passed a listed location, and the like. Based on the operator responses to the prompts (or lack thereof), the PTC system may automatically stop continued movement of the rail vehicle to prevent a collision or other accident from occurring.

But, known vehicle systems such as the above have limitations. For example, the PTC system may overlay or otherwise occlude the map showing the rail vehicle location with the prompts requiring operator responses. This can occur when there are several pending prompts and/or one or more of the prompts includes significant textual detail. This can cause the prompts to consume a significant portion of the limited display space onboard the vehicle. For example, information from the map such as the location of the vehicle, stop targets ahead of the vehicle, etc. may not be visible. Because a response to some of the prompts may require information from the map that is overlaid or occluded by the prompts, this known display of several prompts and/or long prompts can prevent or significantly hinder operators from responding to the prompts. It may be desirable to have a system and method that differs from those that are currently available.

BRIEF DESCRIPTION

In one embodiment, a vehicle control method includes displaying, on a vehicle display device, a map within a designated viewing area of the vehicle display device. The map providing information on a location of a vehicle and one or more restrictions on movement of the vehicle. The method also includes displaying, on the vehicle display device while the map also is displayed, one or more prompts for response from a vehicle operator. The one or more prompts are based at least in part on one or more of: (a) the location of the vehicle along one or more routes and/or (b) the one or more restrictions on movement of the vehicle. The one or more prompts are displayed on the vehicle display device but outside of the designated viewing area of the vehicle display device. The method also includes receiving operator input in response to the one or more prompts to verify that the vehicle is moving according to the one or more restrictions on the movement of the vehicle.

In one embodiment, a vehicle control system includes one or more processors configured to direct a vehicle display device to display a map within a designated viewing area of the vehicle display device. The map provides information on a location of a vehicle and one or more restrictions on movement of the vehicle. The one or more processors are configured to determine one or more prompts based on one or more of: (a) the location of the vehicle along one or more routes and/or (b) the one or more restrictions on movement of the vehicle. The one or more prompts require a response from an operator of the vehicle to continue moving. The one or more processors also are configured to direct the vehicle display device to display the one or more prompts in a second area that is outside of the designated viewing area of the vehicle display device. The one or more processors also are configured to receive operator input in response to the one or more prompts to verify that the vehicle is moving according to the one or more restrictions on the movement of the vehicle.

In one embodiment, a method for controlling a vehicle includes displaying, on a vehicle display device, a map within a designated viewing area of the vehicle display device. The map provides information on a location of a vehicle and one or more restrictions on movement of the vehicle that are based on information provided by a positive train control system. The method also includes displaying, on a vehicle display device while the map also is displayed, one or more prompts based on the information provided by the positive train control system for response from a vehicle operator. The one or more prompts displayed on the vehicle display device but outside of the designated viewing area of the vehicle display device. The method also includes receiving operator input in response to the one or more prompts to verify with the positive train control system that the vehicle is moving according to the one or more restrictions on the movement of the vehicle.

BRIEF DESCRIPTION OF THE DRAWINGS

The subject matter described herein includes descriptions of non-limiting embodiments, with reference to the attached drawings, wherein below.

DETAILED DESCRIPTION

One or more embodiments of the inventive subject matter disclosed herein relate to vehicle control systems and methods that determine prompts to be presented to operators of vehicles and that control display devices onboard the vehicles to present the prompts in such a way to avoid occluding or otherwise hindering visibility of a map concurrently displayed with the prompts. One embodiment of the inventive systems and methods may be used in connection with a movement control system, such as a PTC system, but not all embodiments of the inventive subject matter are limited to the PTC system or rail vehicles. At least one embodiment can be used in connection with displays onboard other types of vehicles, such as automobiles, marine vessels, aircraft, mining vehicles, agricultural vehicles, or other off-highway vehicles. For example, an automobile, aircraft, marine vessel, or other vehicle may display warnings or other requests for information. These warnings or requests can be displayed similar to as described herein for the prompts.

Figure 1:
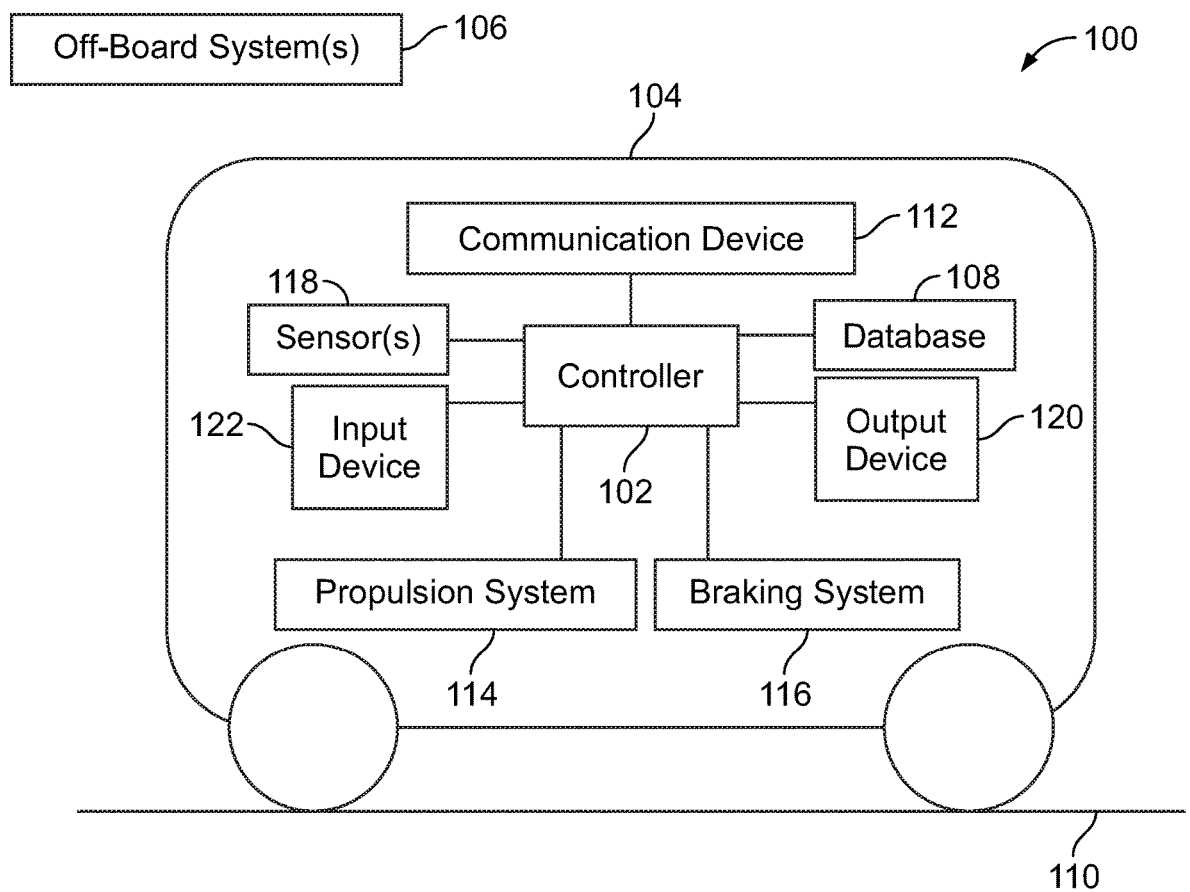
FIG. 1 is a schematic illustration of one embodiment of a vehicle control system.

FIG. 1 is a schematic illustration of one embodiment of a vehicle control system 100. The control system includes a controller 102 disposed onboard a vehicle 104. The controller represents hardware circuitry that includes and/or is connected with one or more processors (e.g., one or more microprocessors, integrated circuits, field programmable gate arrays, microcontrollers, or the like) that perform the operations described herein in connection with the controller. As described above, the vehicle can be a rail vehicle, automobile, marine vessel, aircraft, mining vehicle, agricultural vehicle, or another off-highway vehicle.

The controller can communicate with one or more off-board systems 106 to receive information on targets along one or more routes traveled by the vehicle. The off-board systems can represent databases, wayside devices, sensors, switches, other vehicles, scheduling facilities, etc. The controller can communicate with the off-board systems via a communication device 112 of the control system. The communication device can represent hardware circuitry, such as antennas, modems, transceivers, or the like, for wireless communication with the off-board systems. Optionally, the controller can also or alternatively obtain information on the targets from an onboard database 108 of the control system, such as a tangible and non-transitory computer readable storage medium (e.g., a computer hard drive). This database can be a route database storing locations and/or layouts of the routes, switches, buildings, maintenance orders, slow orders, etc.

The targets may be locations where the vehicle is to stop before proceeding further along a route 110. The targets can be used by the controller to determine whether to allow the vehicle to proceed beyond the stop target if the conditions are safe for the vehicle to proceed or to prevent the vehicle from moving past the stop target if the conditions are unknown or are unsafe for proceeding. Targets can be associated with slow orders, maintenance of a route, locations of switches, locations of crossings or gates, locations of signals, etc.

The controller can determine the location of the vehicle relative to the targets based on information provided from one or more sensors 118 of the control system. The sensors can include a global positioning system receiver, a dead reckoning system, a tachometer, or the like. Based on output provided by the sensors, the controller can determine where the vehicle is located along the route relative to the targets.

The controller can generate prompts for operator responses that are associated with the targets. These prompts can be requests for information provided by the operators to ensure that the vehicle can proceed beyond the various stop targets. As one example, the controller can prompt the operator for information on the state or position of a switch in a route responsive to identifying a target associated with the switch. If the operator provides a response to the prompt to the controller that the switch is in a position to cause the vehicle to travel through the switch onto a first unoccupied route segment, then the controller can determine that the vehicle can safely proceed through the target (e.g., through the switch). But, if the operator provides a response to the prompt that the switch is in another position to cause the vehicle to travel through the switch onto a different, second occupied route segment, then the controller can determine that the vehicle cannot safely proceed through the target. The controller can then prevent the vehicle from moving past the switch.

As another example, the controller can prompt the operator for information on whether another vehicle has passed an upcoming location (e.g., another stop target). If the other vehicle has passed this upcoming location, then the vehicle shown in FIG. 1 can safely pass through the location without risk of a collision with the other vehicle. But, if the other vehicle has not passed the upcoming location, then the vehicle shown in FIG. 1 may not be able to safely pass through the location without risk of collision with the other vehicle. The controller can provide a prompt to the operator of the vehicle shown in FIG. 1 asking whether the other vehicle has passed the target. Based on the operator response to the prompt, the controller can permit or prevent movement of the vehicle through or past the target.

As yet another example, the controller can prompt the operator for information on whether an upcoming segment of the route is currently occupied by another vehicle, by a maintenance crew, or the like. The location of this upcoming segment of the route can be associated with a stop target. If the upcoming route segment is not occupied, then the vehicle can safely pass through the route segment. But, if the upcoming route segment is occupied, then the vehicle may not be able to safely pass through the route segment without risk of collision. The controller can provide a prompt to the operator of the vehicle shown in FIG. 1 asking whether the upcoming segment is occupied. Based on the operator response to the prompt, the controller can permit or prevent movement of the vehicle through or past the target.

The controller can communicate with one or more of a propulsion system 114 and/or a braking system 116 of the vehicle to control or restrict movement of the vehicle. The propulsion system can represent one or more engines, generators, motors, batteries, or the like, that operate to generate propulsive energy or force for moving the vehicle along the route. The braking system can represent one or more friction brakes, air brakes, regenerative brakes (e.g., one or more of the motors of the propulsion system), etc. that generate braking effort to slow or stop movement of the vehicle. The controller can communicate signals with the propulsion system and/or braking system to automatically allow or prevent movement of the vehicle beyond, past, or through a target, as described herein.

An output device 120 onboard the vehicle can provide information to an operator controlling the vehicle. This output device can represent one or more display devices that visually present information. For example, the output device can represent monitors, computer screens, tablet computers, or other electronic display devices. The controller can communicate signals to the output device to direct the output device to visually present information regarding targets, prompts, and other information to the operator onboard the vehicle.

An input device 122 onboard the vehicle can be used by the operator to provide information that responds to the prompts shown on the output device. The input device can represent one or more buttons, switches, keyboards, levers, microphones, etc. In one embodiment, the input device and the output device are combined into the same hardware. For example, the output device can be an electronic display and the input device can be softkeys that are shown on the display. As another example, a touchscreen can operator as both the input device and the output device.

Figure 2:
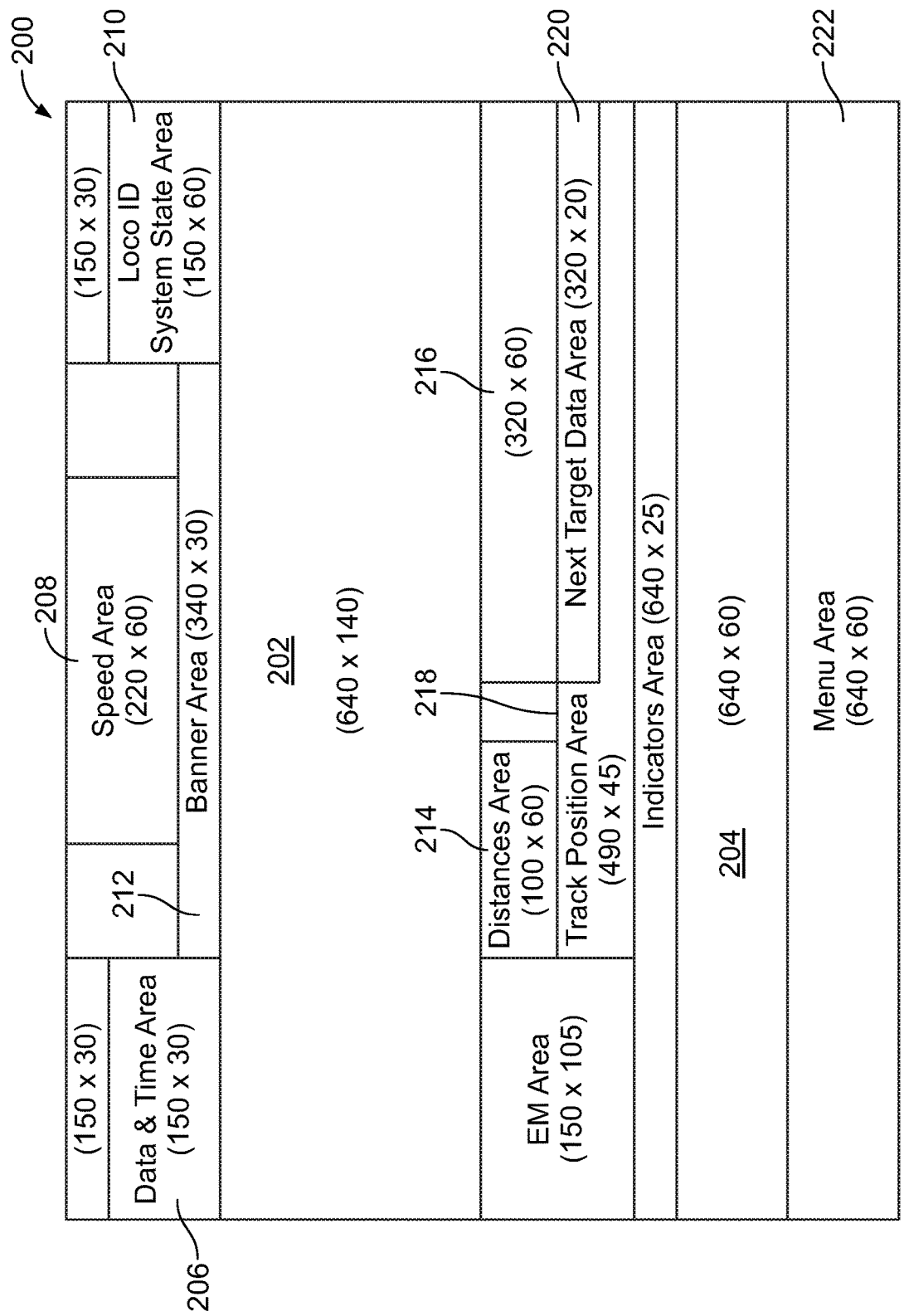
FIG. 2 illustrates one example of a graphical layout or user interface of the output device for presenting a single pending prompt.

FIG. 2 illustrates one example of a graphical layout or user interface 200 of the output device for presenting a single pending prompt. The layout shown in FIG. 2 can be dictated by signals sent from the controller to the output device. The controller can direct the output device to display a map of one or more segments of the route. This map may include (e.g., show) information such as the locations of targets, the location of the vehicle, locations of switches, locations of maintenance zones, locations of slow orders, locations of gates, locations of switches, locations of other vehicles, locations of route segments, etc. As described above, the targets can be restrictions on movement of the vehicle. The map can be shown within a first designated viewing area 202 of the output device. This first viewing area optionally can be referred to as a map area of the output device. The layout of FIG. 2 includes dimensions of various areas in units of pixels, but one or more of the areas may be larger or smaller as described herein, or may have a different shape than what is shown in FIG. 2.

The size of the first viewing area may be static and unchangeable, or may change as dictated by the controller. In one embodiment, the map is persistently shown within the first viewing area. For example, the map may always be displayed within the first viewing area while the vehicle is moving, regardless of what other information or changing information is shown in areas outside of and not overlapping with the first viewing area.

The controller also can direct the output device to display a prompt for an operator response within a second designated viewing area 204, or a single prompt area, of the output device. In one embodiment, the prompt area is small and only able to include the information (e.g., text or alphanumeric strings) of the prompt at a designated text size for a single prompt. For example, the prompt area may be small such that attempting to display multiple prompts and/or lengthy prompts will result in the text of the prompts being too small for the average human operator having 20/20 vision being unable to read the prompts in the single prompt area without the aid of an external magnifier.

The controller can direct the output device to display other information in other areas, such as date and time information in a date and/or time area 206, the moving speed of the vehicle in a speed area 208, identifying information about the vehicle in an identifying area 210, a notice or warning in a banner area 212 (e.g., a current speed limit of the route, the presence of a slow order, a warning of an upcoming crossing, etc.), stopping distances for the vehicle in a stopping distances area 214, information on upcoming locations (e.g., crossings, signals, etc.) in notification of upcoming locations area 216, location of the vehicle on the route in a position area 218, information on the next upcoming target along a direction of movement of the vehicle in an upcoming target area 220, and several softkeys for operator input in a menu area 222. Other areas also can be presented, as shown in FIG. 2. With respect to the stopping distances area, the controller can direct the output device to display warning and stopping distances that are calculated based on characteristics of the vehicle, the current speed of the vehicle, the route, etc. For example, the controller can calculate the distance needed to fully stop movement of the vehicle with full application or engagement of the braking system of the vehicle and/or how far out the controller can generate a warning to engage the braking system to stop the vehicle before colliding with an upcoming object.

In one embodiment, the output device displays the layout shown in FIG. 2 when only a single prompt requires operator response. Optionally, the layout shown in FIG. 2 can be used when only a single prompt that fits within the prompt area requires operator response. This can allow for the other information shown in the other areas to be presented, along with the map in the map area, without the prompt area or any other area overlaying, occluding (e.g., blocking), or extending over or into the map area. The operator is thereby provided with a variety of information in the different areas that may be useful in assisting the operator in providing a response to the prompt. The operator can use the input device to respond to the single displayed prompt and the controller can examine the operator response to determine whether to allow the vehicle to continue moving past a target or to automatically stop or otherwise prevent the vehicle from moving past the target.

At times, however, there may be several prompts pending for operator response and/or one or more pending prompts may be too long to be displayed in the single prompt area in the layout shown in FIG. 2. A prompt may be pending when the operator has not yet provided a response to the prompt, yet a response is required before the controller can allow the vehicle to move beyond a target associated with the pending prompt. Once a pending prompt is responded to and the controller has determined that the vehicle can proceed past a target associated with the pending prompt, the pending prompt becomes a resolved prompt of the target. Several prompts may be pending when a target is associated with multiple prompts and/or several targets associated with different prompts are near the vehicle (e.g., within the map shown in the map area). The controller can direct the output device to change the layout presented to the operator in response to determining that there are several pending prompts and/or at least one pending prompt that is too large for display in the single prompt area shown in FIG. 2.

Figure 3:
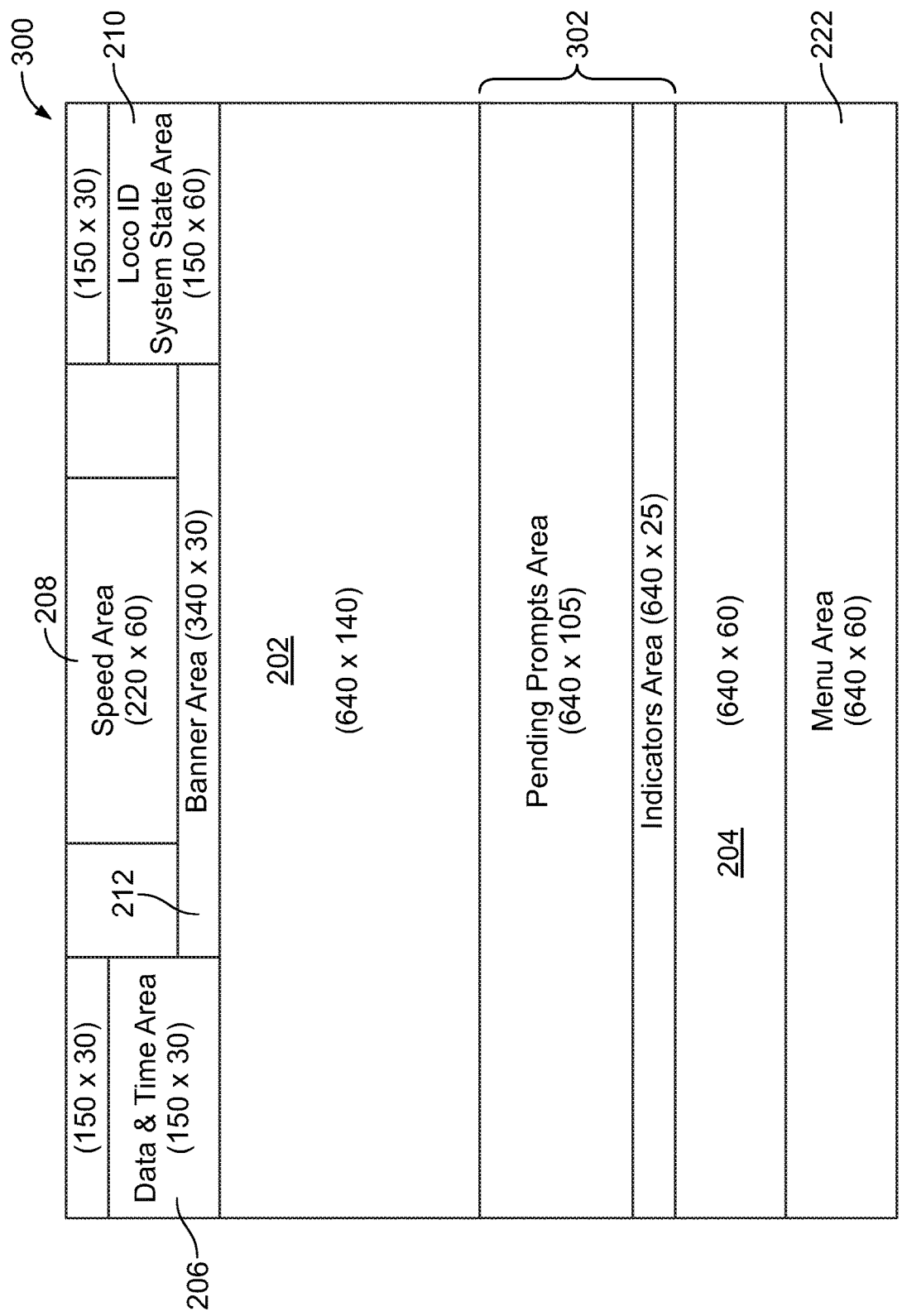
FIG. 3 illustrates one example of another graphical layout or user interface of the output device for presenting multiple pending prompts and/or one or more lengthy prompts.

FIG. 3 illustrates one example of another graphical layout or user interface 300 of the output device for presenting multiple pending prompts and/or one or more lengthy prompts. The layout shown in FIG. 3 can be dictated by signals sent from the controller to the output device. Similar to the layout shown in FIG. 2, the layout shown in FIG. 2 includes the map area, the date and time area, the speed area, the identifying area, and the banner area, with these areas being the same size or same relative size to each other in the layouts shown in FIGS. 2 and 3.

One difference between the layouts shown in FIGS. 2 and 3 is that the multiple and/or lengthy pending prompt layout shown in FIG. 3 is a pending prompts area 302. The pending prompts area can be used by the controller to display multiple and/or lengthy prompts. For example, a list or other structure of pending prompts can be provided in the pending prompts area. The large size of the pending prompts area can permit several prompts to be displayed and/or longer prompts to be displayed.

In the illustrated example, the controller directs the output device to display the pending prompts area over or in place of one or more other areas, such as the distances area, the movement authority area, the position area, the upcoming target area, or the like. Alternatively, the pending prompts area can be shown in place of one or more other areas. But, the controller does not direct the output device to overlay, occlude, or otherwise overlap any part of the map area with the pending prompts area in the illustrated embodiment. This can ensure that the entire map area remains visible to inform the operator and assist the operator in responding to the pending prompts.

For example, the vehicle may be approaching several targets associated with different prompts requiring responses from the operator. The controller can determine these prompts based on the identified targets and can display a list of the prompts in the pending prompts area. The pending prompts may be presented in an order that is based on the order in which the locations of the targets will be reached by the vehicle, based on a priority or hierarchy of the targets (e.g., with targets associated with greater risks to safety having greater priorities), or the like. The map information continues to be presented along with the several pending prompts so that the operator can use the input device (e.g., softkeys shown in the menu area) to select which pending prompt to respond to first. The operator may want to respond to the pending prompts in an order that differs from the order in which the prompts are listed in the pending prompt area.

For example, a first listed pending prompt may request a response on the state or position of a switch in the route, a second listed pending prompt may request a response on whether an upcoming segment of the route beyond or past the switch (along a direction of travel of the vehicle) is occupied by another vehicle, and so on. The vehicle currently may be in a position for the operator to see whether the upcoming route segment is occupied, but not for the operator to see the state or position of the switch. If only a single pending prompt is displayed at a time, the operator may be unable to provide a response to the first pending prompt (e.g., regarding the switch position) until after responding to the second pending prompt (e.g., regarding route occupancy). As a result, the flow of responses through the pending prompts may be hindered and slow down operation and movement of the vehicle.

But, with multiple pending prompts concurrently or simultaneously presented in an area on the output device that does not overlap or occlude the map area, the operator can use the input device or softkeys to scroll through the several pending prompts and select which pending prompt to respond to. This allows the operator to control the order in which the pending prompts are responded to. For example, the operator can respond to the pending prompts that can be responded to using the information in the map area before responding to the pending prompts that require the operator (and vehicle) to be in another location (e.g., closer to a switch, gate, or signal). The operator can more efficiently progress through the pending prompts than other systems that dictate and restrict the prompts that are displayed and the order in which the prompts are responded to.

Figure 4:
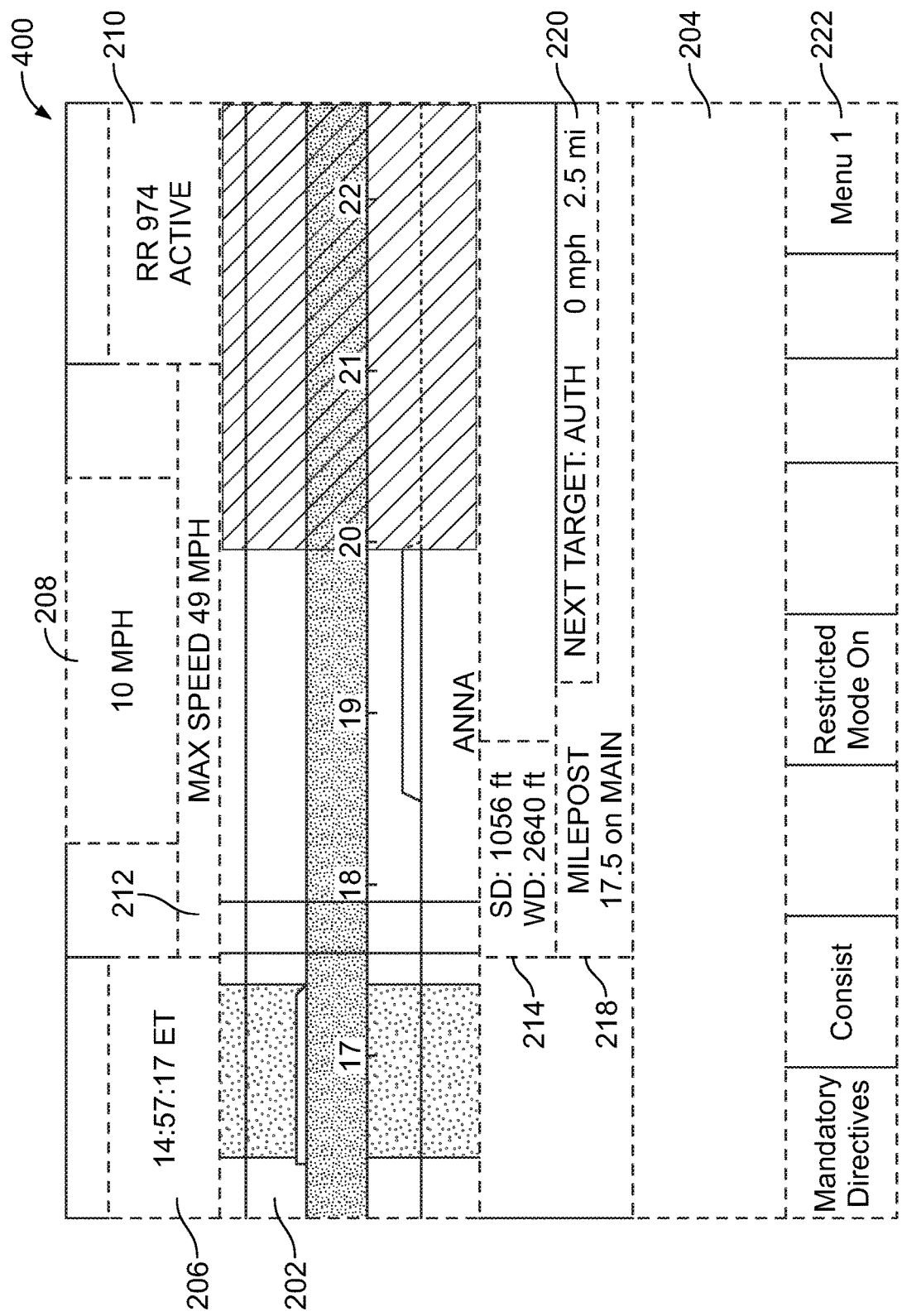
FIG. 4 illustrates one example of a first layout in a progression of layouts that can be presented to an operator to respond to multiple pending prompts.
Figure 5:
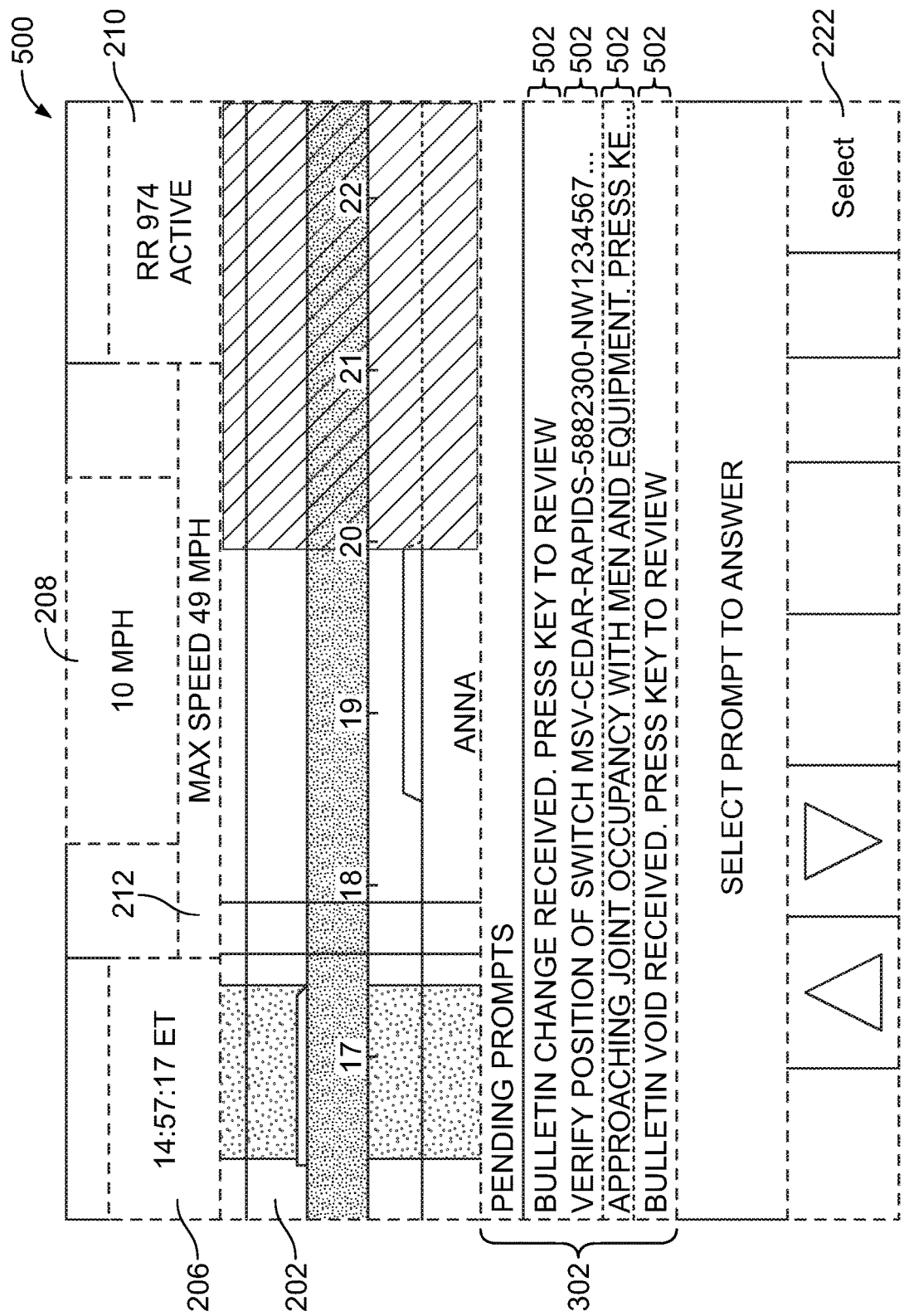
FIG. 5 illustrates one example of a second layout in the progression of layouts that can be presented to an operator to respond to multiple pending prompts.
Figure 6:
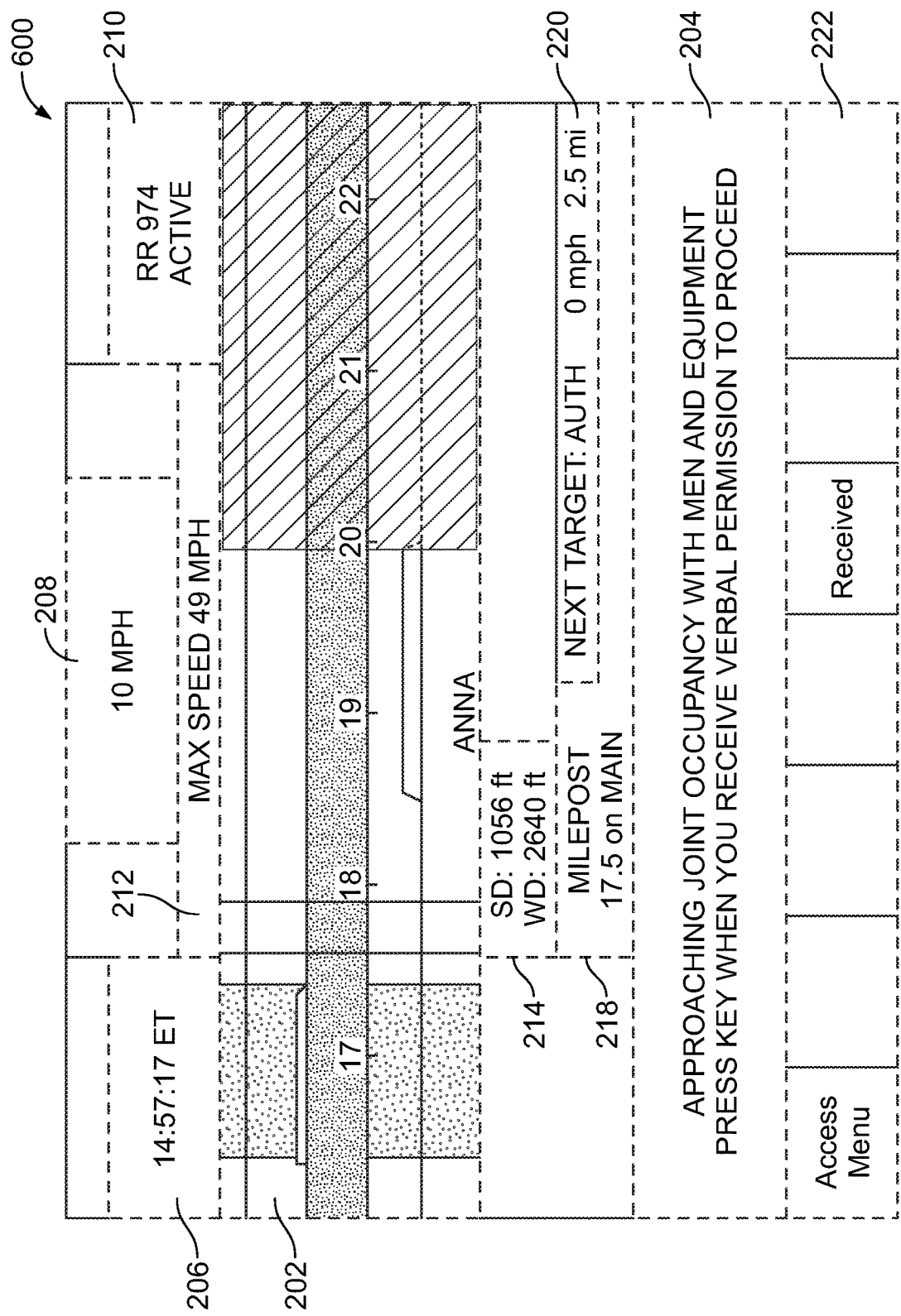
FIG. 6 illustrates one example of a third layout in the progression of layouts that can be presented to an operator to respond to multiple pending prompts.

FIGS. 4 through 6 illustrate one example of a progression of layouts 400, 500, 600 that can be presented to an operator to respond to multiple pending prompts. The controller can direct the output device to display the layout 400 shown in FIG. 4 while no prompts are pending. The layout 400 corresponds to the layout 200 shown in FIG. 2. In these layouts, the map 202 is shown along with the speed 208, date and/or time 206, identifying information 210, stopping distances 214, upcoming target information 220, position information 218, and menu 222. As shown, no prompt is displayed in the prompt area 204. This can result from the controller determining that the vehicle is not heading toward any targets associated with a prompt and/or that responses have been provided for all pending prompts.

Responsive to determining that two or more prompts are pending and/or responsive to determining that a lengthy prompt is pending, the controller can direct the output device to switch to using the layout 500. For example, the controller can refer to the onboard database and/or communications received from off-board systems to determine the targets, the locations of the targets along the route(s) being traveled (or about to be traveled) upon by the vehicle, and the prompts associated with the targets. The controller can determine the location of the vehicle to determine which targets that the vehicle is headed toward. The controller can then select which prompts to display to the operator onboard the vehicle. If there are several of these prompts or one or more of the prompts have a considerable amount of text such that the prompt(s) cannot fit within the single prompt area 204 shown in FIGS. 2 and 4, then the controller can change the layout on the output device to the layout 300, 500.

The layout 500 corresponds to the multiple pending prompt layout 300 shown in FIG. 3. The controller can direct the output device to present several lines 502 of pending prompts in the pending prompt area of the layout shown in FIG. 5. In the illustrated embodiment, the controller directs the output device to display only as much of each pending prompt that will fit on a single line within the several pending prompts area. The controller can direct the output device to display a truncated version of lengthy prompts with ellipses displayed to indicate to the operator that there is additional text for the truncated prompt(s). In the illustrated example, there are four pending prompts shown with the second and third pending prompts shown as truncated prompts. The portion of the truncated prompt that is displayed provides context to the remainder of the prompt. This portion can be referred to as a contextual portion of the lengthy prompt as the portion provides at least some information about the prompt to allow an operator to at least partially discern the content of the lengthy prompt.

In operation, the operator can use the input device (e.g., the softkeys displayed in the menu area) to move between and select one of the several pending prompts. For example, the controller can direct the output device to highlight a first pending prompt and the operator can use the input device to move between and highlight different pending prompts. The operator can then use the input device to select which pending prompt that the operator wants to respond to next. For example, the operator can refer to the map which continues to be displayed and the list of several pending prompts to determine which of the pending prompts that the operator is able to respond to with currently available information, which of the pending prompts that the operator needs to respond to before responding to one or more other pending prompts, etc. In contrast to other systems that only display a single pending prompt at a time, this process allows for the operator to decide and select which of several pending prompts that the operator will respond to next.

The operator can select a pending prompt using the input device and, in response, the controller can direct the output device to change the layout to the layout 600 shown in FIG. 6. In the illustrated embodiment, the layout 600 corresponds to the single prompt layout 200 shown in FIG. 2. For example, the controller directs the output device to switch to presenting the layout 200, 600 so that the pending prompt that was selected by the operator is shown in the single prompt area 204. As shown in FIGS. 5 and 6, while only a contextual portion of a lengthy pending prompt may be shown in the several pending prompts area 302 in the layouts 300, 500, the entirety of the lengthy prompt may be shown in the single prompt area 204 in the layouts 200, 600 responsive to the operator selecting the lengthy prompt. The controller can direct the output device to present the lengthy prompt that is selected on multiple (e.g., two or more) lines within the prompt area. The other pending prompts that were not selected are no longer presented on the output device. Alternatively, the controller can direct the output device to continue presenting at least part of one or more of the pending prompts that were not selected.

The controller can then receive a response from the operator to the selected prompt via the input device. The controller can determine whether this response indicates that the vehicle can safely proceed beyond, past, or through the target associated with the selected prompt. As described above, depending on this response, the controller may allow or prevent continued movement of the vehicle past the target.

Figure 7:
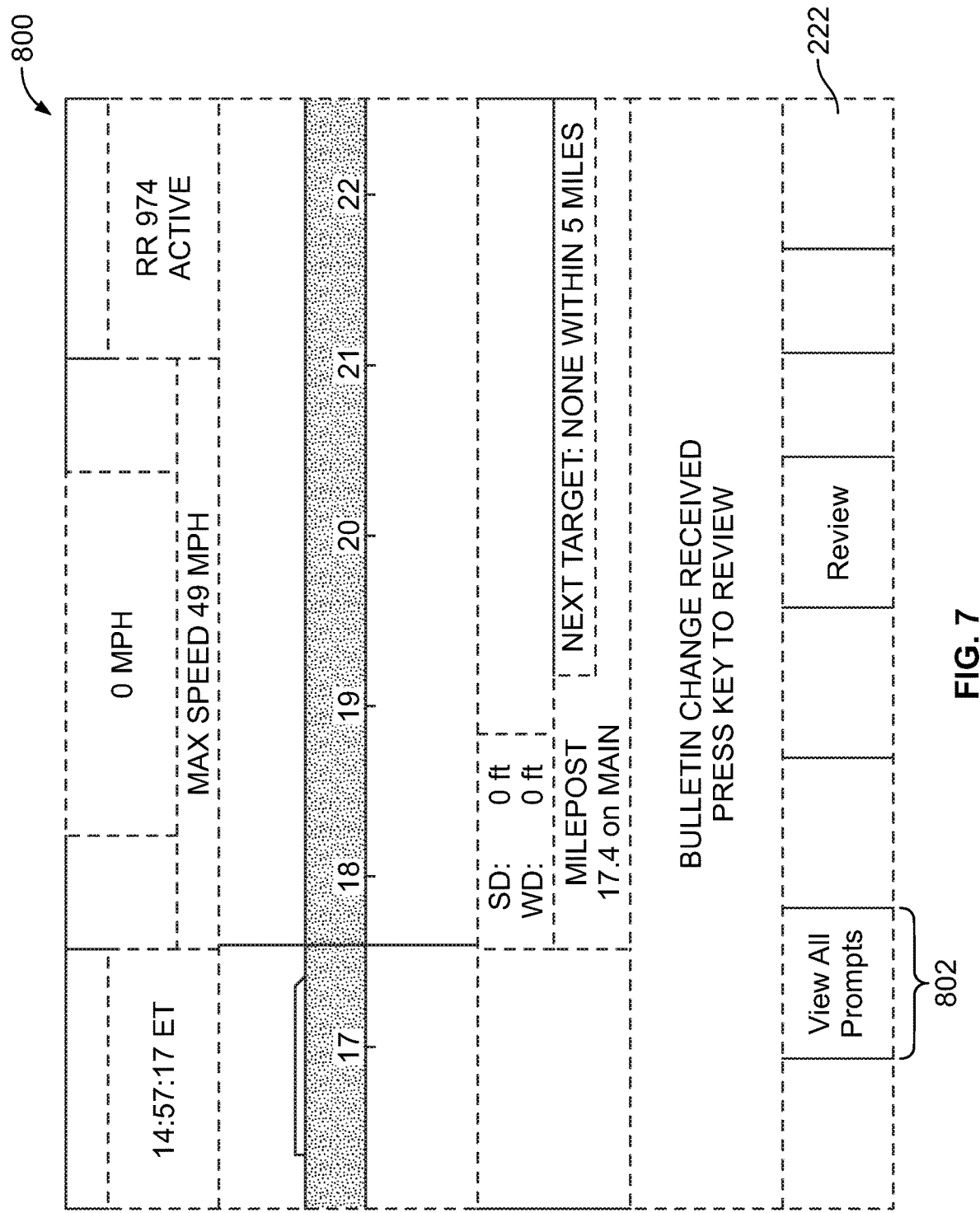
FIG. 7 illustrates another example of a graphical user interface or layout that can be displayed on the output device by the controller.

FIG. 7 illustrates another example of a graphical user interface or layout 800 that can be displayed on the output device by the controller. In some circumstances, several prompts are pending but only a single pending prompt is shown. For example, an operator may have used the softkeys shown in the menu 222 in FIG. 5 to select one of the pending prompts and the controller may have directed the output device to switch from presenting the multiple-prompt-displayed layout of FIG. 5 to the single-prompt-displayed layout of FIG. 6. The layout shown in FIG. 7 is another option of how the menu can be presented and interacted with by the operator. In the illustrated example of FIG. 7, the controller can direct the output device to display and provide the operator with an input selection 802 to view all or more of the pending prompts. Responsive to the operator using the input device (e.g., the softkeys) to select the input selection shown in FIG. 7, the controller can direct the output device to display multiple pending prompts, such as by changing the display on the output device from the layout shown in FIG. 7 to the layout shown in FIG. 5. This can allow for the operator to toggle or otherwise switch from selecting and viewing a single pending prompt of several pending prompts to viewing multiple or all of the pending prompts.

Figure 8:
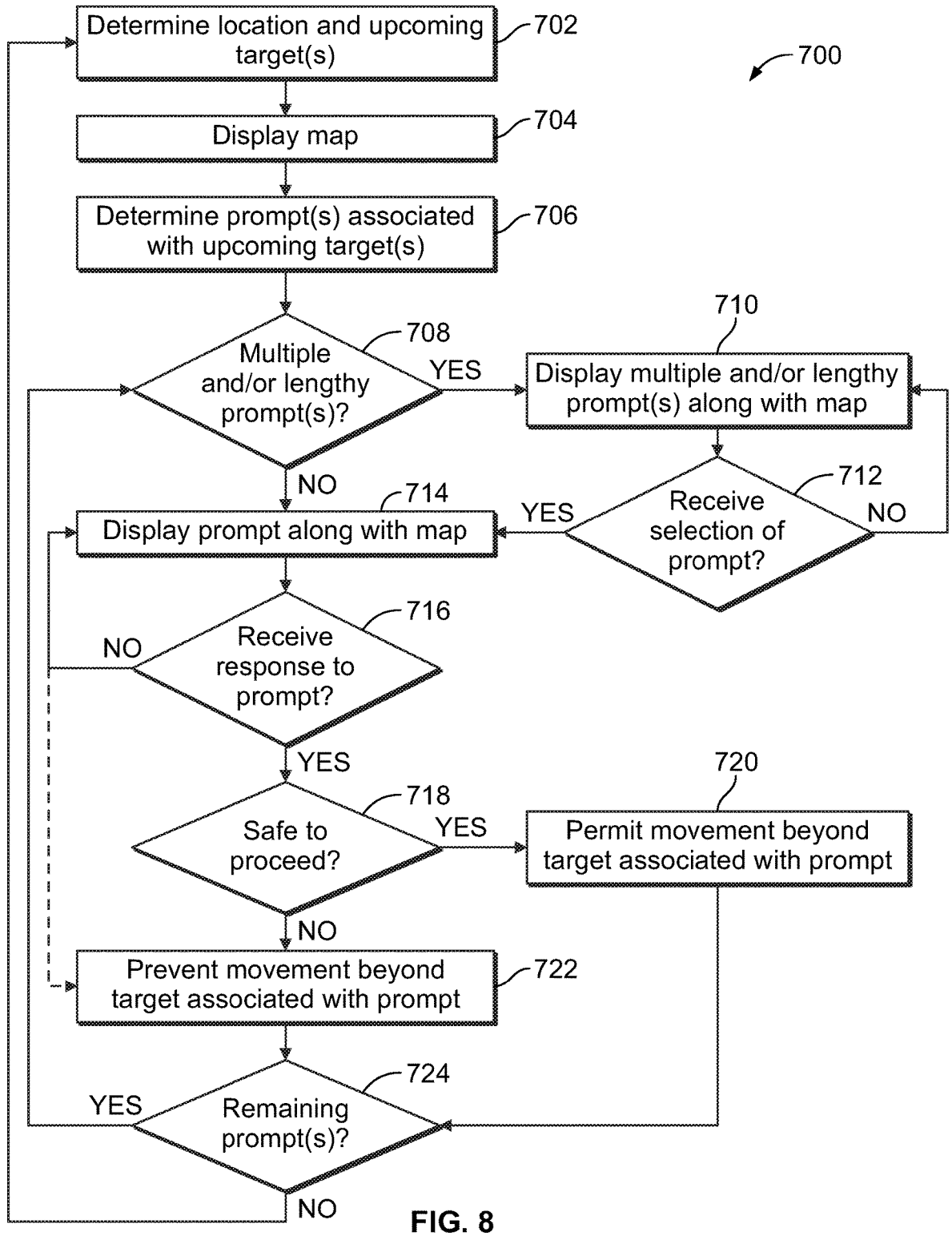
FIG. 8 illustrates a flowchart of one embodiment of a method for controlling a vehicle.

FIG. 8 illustrates a flowchart of one embodiment of a method 700 for controlling a vehicle. The method can represent operations performed by the control system and/or controller described herein. While at least some of the operations are shown and/or described as occurring sequentially, two or more of these operations can be performed in parallel (e.g., concurrently or simultaneously) or in a different order.

At 702, a location of the vehicle and one or more upcoming targets are determined. The target locations can be determined from the onboard database and/or off-board systems, and the vehicle location can be input by an operator, determined by sensors, or the like. At 704, a map is displayed. This map can be presented on an output device and show the location of the vehicle relative to one or more of the targets that were determined. At 706, one or more prompts associated with the upcoming target(s) are determined. These prompts can be stored in the onboard database with the target information, can be received from an off-board source, or the like. At 708, a determination is made as to whether there are multiple prompts and/or any lengthy prompts associated with the upcoming target(s). For example, the controller can determine whether the all the pending prompts can be shown within a defined area on the output device without making the prompts illegible to an average human viewer without using magnification. If the entire and/or all pending prompts cannot be displayed at the same time within the designated area on the output device, then display of the prompts may need to be altered to ensure that the map continues to be visible to an operator of the vehicle. As a result, flow of the method 700 can proceed toward 710. But, if only a single prompt is pending and the prompt is short enough to be entirely displayed within the defined or designated area, then the display may not need to be altered to ensure that the operator can continue viewing both the map and the pending prompt. As a result, flow of the method 700 can proceed toward 714.

At 710, multiple pending prompts and/or a lengthy prompt is displayed along with the map. As described above, the controller can change the layout on the output device so that at least contextual portions of several pending prompts are displayed along with the map. This allows the operator to continue viewing the map while deciding which prompt to respond to and/or how to respond to the prompt(s). At 712, a determination is made as to whether a pending prompt is selected for response. For example, the controller can determine whether the operator used the input device to select a prompt from several listed pending prompts and/or to select a lengthy prompt for which only a contextual portion is displayed. If selection of a pending prompt was received, then additional details about the selected prompt can be presented. As a result, flow of the method 700 can proceed toward 714 for display of a single (i.e., selected) prompt. But, if no selection is received, then the several prompts and/or lengthy prompt(s) can continue to be displayed for the operator to view along with the map. As a result, flow of the method 700 can return toward 710 until a selection is made (or the method 700 is terminated).

At 714, the prompt is displayed along with the map. For example, if there is only a single pending prompt, that prompt can be shown alongside, and not over or in a way that blocks, the map. If there were several prompts and/or lengthy prompts and the operator selected a prompt at 712, then the selected prompt can be displayed. The selected prompt can be displayed by showing more than a contextual portion of the prompt. For example, the entire text of the prompt can be shown. The other prompts that were not selected optionally may no longer be shown.

At 716, a determination is made as to whether a response to the displayed and/or selected prompt is received. The controller can determine whether the operator has used the input device to provide information requested by the prompt. If an operator response is provided, then another determination can be made as to whether the response indicates that the vehicle can safely proceed. As a result, flow of the method 700 can proceed toward 718. But, if no response is received, then the determination of whether the vehicle can safely proceed may not be able to be made. As a result, flow of the method 700 can return toward 714 until a response is received. Alternatively, flow of the method 700 can proceed toward 722 (where continued movement is prohibited as the response to the prompt has not been received, as described herein).

At 718, a determination is made as to whether the vehicle can safely proceed past the target for which the prompt was responded. For example, the controller can determine if the response provided for the prompt of a target indicates that a switch is in a correct position (for the vehicle to continue moving along a planned path), that an upcoming segment of a route is unoccupied, that the vehicle is traveling slower than a slow order or other speed limit, etc. If the response indicates that the vehicle can continue safely moving beyond the target, then the vehicle may continue moving and flow of the method 700 can proceed toward 720. But, if the response to the prompt does not indicate that the vehicle can continue safely moving beyond the target associated with the prompt, then the vehicle may not be able to safely continue moving and flow of the method 700 can proceed toward 722. Optionally, if no response to the prompt is received at 716, flow of the method 700 can proceed toward 722, as described above.

At 720, the vehicle can continue moving beyond the target for which the response was received. The controller can determine that the response indicates that it is safe for the vehicle to continue moving beyond the target. As a result, the controller can allow the operator to manually control the vehicle to move beyond the target and/or can allow the vehicle to autonomously move beyond the target.

At 722, the vehicle is not permitted to continue moving beyond the target. For example, the response received at 716 and/or the lack of a response can indicate that the vehicle cannot safely continue to move beyond the target. The controller can prevent the vehicle from moving past the target by automatically reducing propulsion generated by the propulsion system and/or by automatically controlling the braking system to stop movement of the vehicle before the vehicle reaches or passes the location of the target.

At 724, a determination is made as to whether there are any additional pending prompts. For example, if several pending prompts were presented at 710 and one or more of these pending prompts remains for receiving a response, then flow of the method 700 can return toward 708 to determine how to present these remaining prompts. But, if no additional prompts remain, then flow of the method 700 can return toward 702. Optionally, flow of the method 700 can terminate.

In one embodiment, a vehicle control method includes displaying, on a vehicle display device, a map within a designated viewing area of the vehicle display device. The map providing information on a location of a vehicle and one or more restrictions on movement of the vehicle. The method also includes displaying, on the vehicle display device while the map also is displayed, one or more prompts for response from a vehicle operator. The one or more prompts are based at least in part on one or more of: (a) the location of the vehicle along one or more routes and/or (b) the one or more restrictions on movement of the vehicle. The one or more prompts are displayed on the vehicle display device but outside of the designated viewing area of the vehicle display device. The method also includes receiving operator input in response to the one or more prompts to verify that the vehicle is moving according to the one or more restrictions on the movement of the vehicle.

Optionally, the one or more prompts are displayed to overlay and replace other movement information previously displayed on the vehicle display device without overlaying or replacing the map that is concurrently displayed on the vehicle display device.

Optionally, displaying the one or more prompts includes displaying plural prompts currently requiring the response from the vehicle operator.

Optionally, displaying the plural prompts includes displaying all of the prompts currently requiring the response from the vehicle operator.

Optionally, at least one of the plural prompts is displayed with a contextual portion of the at least one prompt shown on a single display line of the vehicle display device.

Optionally, the method also includes receiving a selection of the at least one of the plural prompts having the contextual portion displayed on the vehicle display device, eliminating display of one or more other prompts of the plural prompts from the vehicle display device, and displaying an entirety of the at least one of the plural prompts that is selected on two or more display lines of the vehicle display device.

Optionally, the one or more prompts that are displayed are provided by a positive train control system.

Optionally, the designated viewing area in which the map is displayed is an unchanging, fixed size within the vehicle display device.

In one embodiment, a vehicle control system includes one or more processors configured to direct a vehicle display device to display a map within a designated viewing area of the vehicle display device. The map provides information on a location of a vehicle and one or more restrictions on movement of the vehicle. The one or more processors are configured to determine one or more prompts based on one or more of: (a) the location of the vehicle along one or more routes and/or (b) the one or more restrictions on movement of the vehicle. The one or more prompts require a response from an operator of the vehicle to continue moving. The one or more processors also are configured to direct the vehicle display device to display the one or more prompts in a second area that is outside of the designated viewing area of the vehicle display device. The one or more processors also are configured to receive operator input in response to the one or more prompts to verify that the vehicle is moving according to the one or more restrictions on the movement of the vehicle.

Optionally, the one or more processors are configured to direct the display device to present the one or more prompts to overlay and replace other movement information previously displayed on the vehicle display device without overlaying or replacing the map that is concurrently displayed on the vehicle display device.

Optionally, the one or more processors are configured to direct the vehicle display device to display two or more of the prompts currently requiring the response from the vehicle operator.

Optionally, the one or more processors are configured to direct the vehicle display device to display all of the two or more prompts currently requiring the response from the vehicle operator.

Optionally, the one or more processors are configured to direct the vehicle display device to display at least one of the prompts with a contextual portion of the at least one prompt shown on a single display line of the vehicle display device.

Optionally, the one or more processors are configured to receive an operator selection of the at least one prompt having the contextual portion displayed on the vehicle display device. The one or more processors can be configured to direct the vehicle display device to eliminate display of one or more other prompts of the two or more prompts from the vehicle display device and to display an entirety of the at least one of the prompts that is selected on two or more display lines of the vehicle display device.

Optionally, the one or more prompts are received from a positive train control system.

Optionally, the designated viewing area in which the map is displayed is an unchanging, fixed size within the vehicle display device.

In one embodiment, a method for controlling a vehicle includes displaying, on a vehicle display device, a map within a designated viewing area of the vehicle display device. The map provides information on a location of a vehicle and one or more restrictions on movement of the vehicle that are based on information provided by a positive train control system. The method also includes displaying, on a vehicle display device while the map also is displayed, one or more prompts based on the information provided by the positive train control system for response from a vehicle operator. The one or more prompts displayed on the vehicle display device but outside of the designated viewing area of the vehicle display device. The method also includes receiving operator input in response to the one or more prompts to verify with the positive train control system that the vehicle is moving according to the one or more restrictions on the movement of the vehicle.

Optionally, the one or more prompts are displayed to overlay and replace other movement information previously displayed on the vehicle display device without overlaying or replacing the map that is concurrently displayed on the vehicle display device.

Optionally, displaying the one or more prompts includes displaying plural prompts currently requiring the response from the vehicle operator. At least one of the plural prompts is displayed with a contextual portion of the at least one prompt shown on a single display line of the vehicle display device. The method also can include receiving a selection of the at least one of the plural prompts having the contextual portion displayed on the vehicle display device, eliminating display of one or more other prompts of the plural prompts from the vehicle display device, and displaying an entirety of the at least one of the plural prompts that is selected on two or more display lines of the vehicle display device.

Optionally, the designated viewing area in which the map is displayed is an unchanging, fixed size within the vehicle display device.

Reference is made in detail to various embodiments of the inventive subject matter, examples of which are illustrated in the accompanying drawings. The same reference numerals used throughout the drawings may refer to the same or like parts. As disclosed below, multiple versions of a same element may be disclosed. Likewise, with respect to other elements, a singular version may be disclosed. Neither multiple versions disclosed nor a singular version disclosed shall be considered limiting. Specifically, although multiple versions are disclosed, a singular version may be utilized. Likewise, where a singular version is disclosed, multiple versions may be utilized. The description is illustrative and not restrictive. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended clauses, along with the full scope of equivalents to which such clauses are entitled.

In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the clauses, and may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

What is claimed is:

1. A method comprising:
   displaying, on a vehicle display device, a map within a designated viewing area of the vehicle display device, the map providing information on a location of a vehicle along one or more routes, and one or more restrictions on movement along the one or more routes of the vehicle;
   displaying, on the vehicle display device while the map also is displayed, one or more prompts for response from a vehicle operator, the one or more prompts based at least in part on one or more of: (a) the location of the vehicle along the one or more routes (b) the one or more restrictions on movement of the vehicle, the one or more prompts displayed on the vehicle display device but outside of the designated viewing area of the vehicle display device;
   prompting an operator for an input in response to the one or more prompts to verify that the vehicle is moving according to the one or more restrictions on the movement of the vehicle; and
   in response to receiving no operator input or receiving an operator input indicating that the vehicle is moving contrary to the one or more restrictions, preventing the vehicle from moving contrary to the one or more restrictions by one or both of automatically reducing propulsion generated by a propulsion system of the vehicle or automatically controlling a braking system of the vehicle to stop or slow movement of the vehicle.

2. The method of claim 1, wherein the one or more prompts are displayed to overlay and replace other movement information previously displayed on the vehicle display device without overlaying or replacing the map that is concurrently displayed on the vehicle display device.

3. The method of claim 1, wherein displaying the one or more prompts includes displaying plural prompts currently requiring a response from the vehicle operator.

4. The method of claim 3, wherein displaying the plural prompts includes displaying all of the plural prompts currently requiring the response from the vehicle operator.

5. The method of claim 3, wherein at least one of the plural prompts is displayed with a contextual portion of the at least one prompt shown on a single display line of the vehicle display device.

6. The method of claim 5, further comprising:
receiving a selection of the at least one of the plural prompts having the contextual portion displayed on the vehicle display device;
eliminating display of one or more other prompts of the plural prompts from the vehicle display device; and
displaying an entirety of the at least one of the plural prompts that is selected on two or more display lines of the vehicle display device.

7. The method of claim 1, wherein the one or more prompts that are displayed are provided by a positive train control system.

8. The method of claim 1, wherein the designated viewing area in which the map is displayed is an unchanging, fixed size within the vehicle display device.

9. A system comprising:
one or more processors configured to direct a vehicle display device to display a map within a designated viewing area of the vehicle display device, the map providing information on a location of a vehicle along one or more routes, and one or more restrictions on movement along the one or more routes of the vehicle, the one or more processors configured to determine one or more prompts based on one or more of (a) the location of the vehicle along the one or more routes or (b) the one or more restrictions on movement of the vehicle, the one or more prompts provided by a movement control system that currently require a response from an operator of the vehicle,
the one or more processors also configured to direct the vehicle display device to display the one or more prompts in a second area that is outside of the designated viewing area of the vehicle display device,
the one or more processors also configured to prompt an operator for an input in response to the one or more prompts to verify that the vehicle is moving according to the one or more restrictions on the movement of the vehicle,
wherein, in response to receiving no operator input or receiving an operator input indicating that the vehicle is moving contrary to the one or more restrictions, the one or more processors are also configured to prevent the vehicle from moving contrary to the one or more restrictions by one or both of automatically reducing propulsion generated by a propulsion system of the vehicle or automatically controlling a braking system of the vehicle to stop or slow movement of the vehicle.

10. The system of claim 9, wherein the one or more processors are configured to direct the display device to present the one or more prompts to overlay and replace other movement information previously displayed on the vehicle display device without overlaying or replacing the map that is concurrently displayed on the vehicle display device.

11. The system of claim 9, wherein the one or more processors are configured to direct the vehicle display device to display two or more of the prompts currently requiring the response from the vehicle operator.

12. The system of claim 11, wherein the one or more processors are configured to direct the vehicle display device to display all of the two or more prompts currently requiring the response from the vehicle operator.

13. The system of claim 11, wherein the one or more processors are configured to direct the vehicle display device to display at least one of the two or more prompts with a contextual portion of the at least one of the two more prompts shown on a single display line of the vehicle display device.

14. The system of claim 13, wherein the one or more processors are configured to receive an operator selection of the at least one prompt having the contextual portion displayed on the vehicle display device, the one or more processors configured to direct the vehicle display device to eliminate display of one or more other prompts of the two or more prompts from the vehicle display device and to display an entirety of the at least one of the prompts that is selected on two or more display lines of the vehicle display device.

15. The system of claim 9, wherein the movement control system is a positive train control system.

16. The system of claim 9, wherein the designated viewing area in which the map is displayed is an unchanging, fixed size within the vehicle display device.

17. A method comprising:
displaying, on a vehicle display device, a map within a designated viewing area of the vehicle display device, the map providing information on a location of a vehicle along or more routes, and one or more restrictions on movement along the one or more routes of the vehicle that are based on information provided by a positive train control system;
displaying, on the vehicle display device while the map also is displayed, one or more prompts based on the information provided by the positive train control system for response from a vehicle operator, the one or more prompts displayed on the vehicle display device but outside of the designated viewing area of the vehicle display device;
prompting an operator for an input in response to the one or more prompts to verify with the positive train control system that the vehicle is moving according to the one or more restrictions on the movement of the vehicle; and
in response to receiving no operator input or receiving an operator input indicating that the vehicle is moving contrary to the one or more restrictions, preventing the vehicle from moving contrary to the one or more restrictions by one or both of automatically reducing propulsion generated by a propulsion system of the vehicle or automatically controlling a braking system of the vehicle to stop or slow movement of the vehicle.

18. The method of claim 17, wherein the one or more prompts are displayed to overlay and replace other movement information previously displayed on the vehicle display device without overlaying or replacing the map that is concurrently displayed on the vehicle display device.

19. The method of claim 17, wherein displaying the one or more prompts includes displaying plural prompts currently requiring a response from the vehicle operator, at least one of the plural prompts displayed with a contextual portion of the at least one prompt shown on a single display line of the vehicle display device, and further comprising:
receiving a selection of the at least one of the plural prompts having the contextual portion displayed on the vehicle display device;

eliminating display of one or more other prompts of the plural prompts from the vehicle display device; and displaying an entirety of the at least one of the plural prompts that is selected on two or more display lines of the vehicle display device.

20. The method of claim 17, wherein the designated viewing area in which the map is displayed is an unchanging, fixed size within the vehicle display device.

21. The method of claim 1, wherein the vehicle is a rail vehicle.

22. The system of claim 9, wherein the vehicle is a rail vehicle.

* * * * *